(12) United States Patent
Lin

(10) Patent No.: US 6,454,430 B1
(45) Date of Patent: Sep. 24, 2002

(54) FOLDABLE EMERGENCY HAMMER

(76) Inventor: Ming-Hsuan Lin, No. 29-2, Sec. 1, Tafeng Rd., Tantzu Hsiang, Taichung Hsien (TW)

( * ) Notice: Subject to any disclaimer, the term of this patent is extended or adjusted under 35 U.S.C. 154(b) by 0 days.

(21) Appl. No.: 09/839,625

(22) Filed: Apr. 19, 2001

(51) Int. Cl.[7] .............................................. B25B 23/18
(52) U.S. Cl. .......................... 362/119; 362/109; 7/100; 7/144; 7/158
(58) Field of Search ............................. 7/100, 118, 143, 7/144, 148, 158, 166; 362/109, 119, 120, 253

(56) References Cited

U.S. PATENT DOCUMENTS

| | | | | |
|---|---|---|---|---|
| 539,130 A | * | 5/1895 | Haynes | 7/144 |
| 1,307,018 A | * | 6/1919 | Nomeland | 7/142 |
| 5,657,543 A | * | 8/1997 | Collins | 30/367 |
| 5,903,942 A | * | 5/1999 | Hasegawa | 7/144 |

\* cited by examiner

*Primary Examiner*—Alan Cariaso
*Assistant Examiner*—Sharon Payne
(74) *Attorney, Agent, or Firm*—Brinks Hofer Gilson & Lione

(57) ABSTRACT

An emergency hammer includes a handle unit and a hammerhead. The handle unit includes a handle and a rotary rod. The rotary rod has a pivot end connected pivotally to the handle, and a free end connected fixedly to the hammerhead. The rotary rod can be turned relative to the handle between an unfolded position, where the total length of the handle unit is equal to the sum of the lengths of the handle and the rotary rod, and a folded position, where the total length of the handle unit is approximately equal to the length of the handle.

7 Claims, 6 Drawing Sheets

FOLDABLE EMERGENCY HAMMER

BACKGROUND OF THE INVENTION

1. Field of the Invention

This invention relates to an emergency hammer for smashing the windows of an automobile, more particularly to a foldable emergency hammer.

2. Description of the Related Art

When a car encounters a traffic accident, and when the doors thereof cannot be opened, it is necessary for the occupants in the car to smash at least one window of the car for escape. Accordingly, an emergency hammer is developed, and is generally put in a car. Normally, a cutter is attached to such an emergency hammer for cutting a seat belt. A known emergency hammer suffers from the following drawbacks:

(1) A handle of the hammer is relatively long, thereby occupying too much space in the car.
(2) The cutter has a blade portion, which is exposed to the exterior of the hammer and which may injure the user.

SUMMARY OF THE INVENTION

An object of this invention is to provide an emergency hammer with a handle unit, which can be folded, thereby reducing the total length of the hammer.

Another object of this invention is to provide an emergency hammer, which has a pivotable blade lid that is biased to cover a blade portion of a cutter.

According to this invention, an emergency hammer includes a handle unit and a hammerhead. The handle unit includes a handle and a rotary rod. The rotary rod has a pivot end connected pivotally to the handle, and a free end connected fixedly to the hammerhead. The rotary rod can be turned relative to the handle between an unfolded position, where the total length of the handle unit is equal to the sum of the lengths of the handle and the rotary rod, and a folded position, where the total length of the handle unit is approximately equal to the length of the handle. Preferably, a lid is disposed pivotally on the rotary rod, and is biased by a spring to cover a blade portion of a cutter that is attached to the rotary rod.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 5:
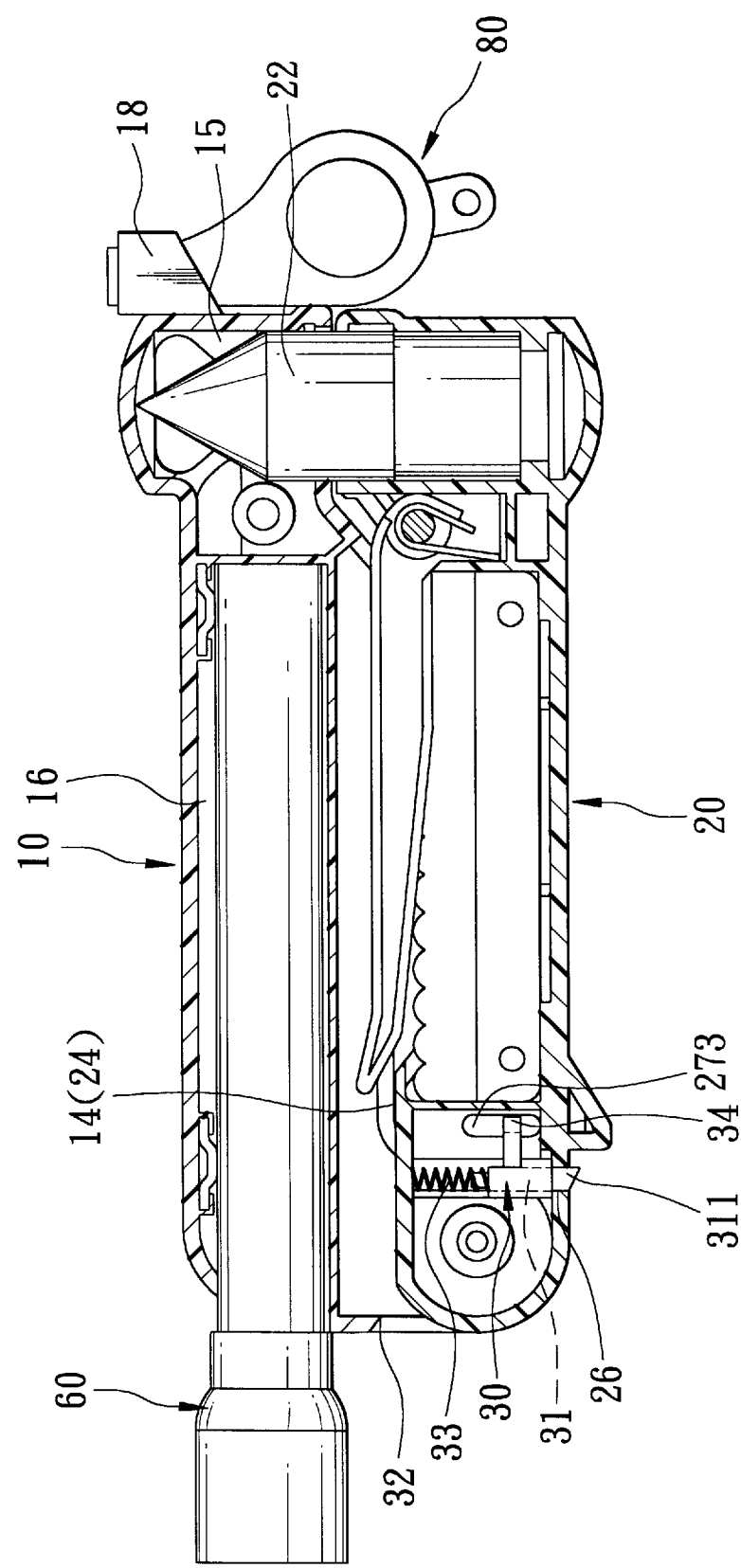
FIG. 5 is a schematic sectional view of the preferred embodiment, illustrating how a rotary rod is disposed at a folded position.

Referring to FIGS. 1, 2, 3, and 4, the preferred embodiment of a foldable emergency hammer according to this invention is shown to include an elongated handle unit consisting of a handle 10 and a rotary rod 20, a lock unit 30, a cutter 40, a blade lid 50, a flashlight 60, a pivot pin 70, and a whistle 80 (see FIG. 5). The rod 20 is locked at an unfolded position shown in FIG. 2 relative to the handle 10 by means of the lock unit 30, and is rotatable to a folded position shown in FIG. 5, when it is unlocked from the handle 10.

The handle 10 has a free end 11, a pivot end 12, an outer side surface 13, and an inner side surface 14. The free end 11 includes a fixed tubular element 111 which has a hole 15 that is formed in the inner side surface 14 and that extends in a transverse direction of the handle 10. The pivot end 12 has an end surface, which is formed with a bore 16 that extends along the length of the handle 10 and that accommodates the flashlight 60. In the bore 16, a resilient unit is disposed, and includes two reed springs 17, which are confined within two restricting grooves 161 and which have pushing portions 171 that press the flashlight 60 against an inner surface of the handle 10, thereby holding the same within the bore 16. The tubular element 111 is provided with a fixed socket element 18 with a bore 181 (see FIG. 3), within which the whistle 80 (see FIG. 5) is press fitted.

The rod 20 has a pivot end 21 connected pivotally to the pivot end 12 of the handle 10 by means of the pivot pin 70, a free end with a fixed hammerhead 22, an inner side surface 23, and an outer side surface 24.

Figure 1:
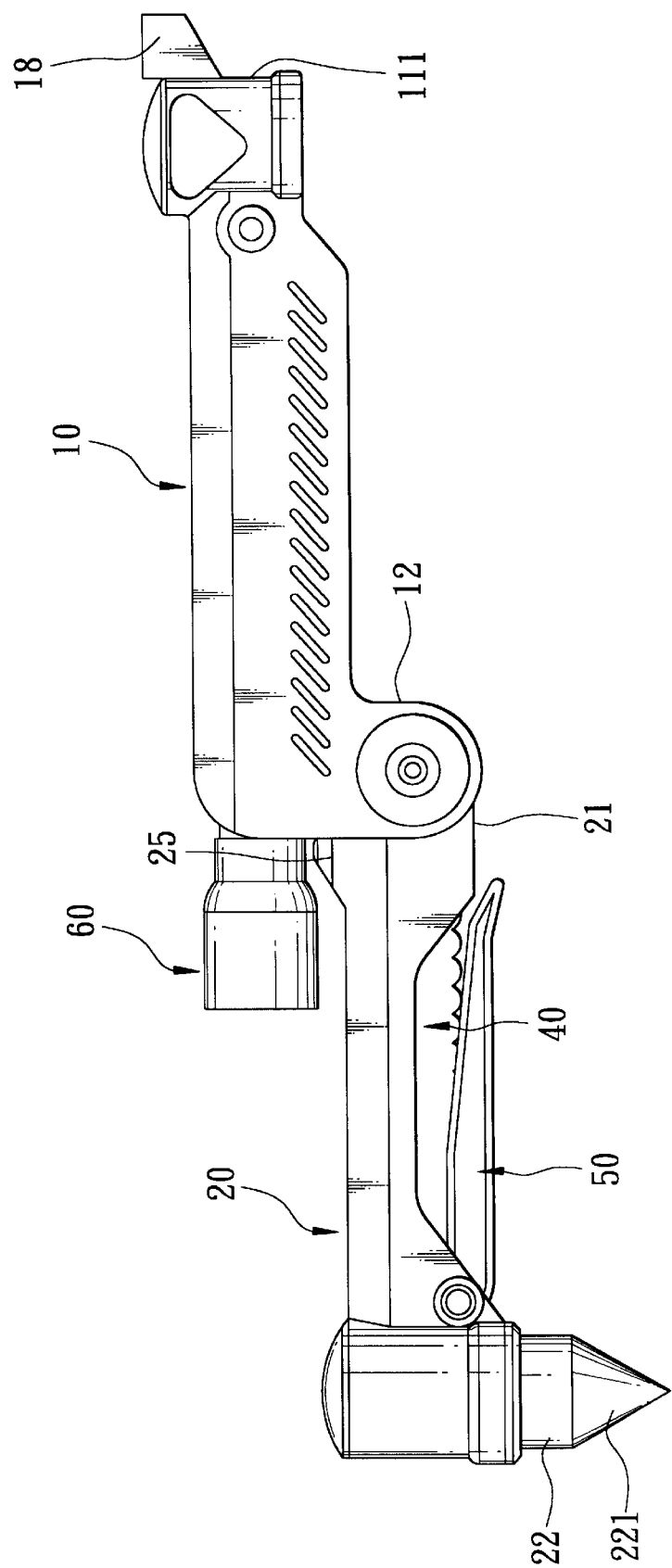
FIG. 1 is a front view of the preferred embodiment of a foldable emergency hammer according to this invention.
Figure 2:
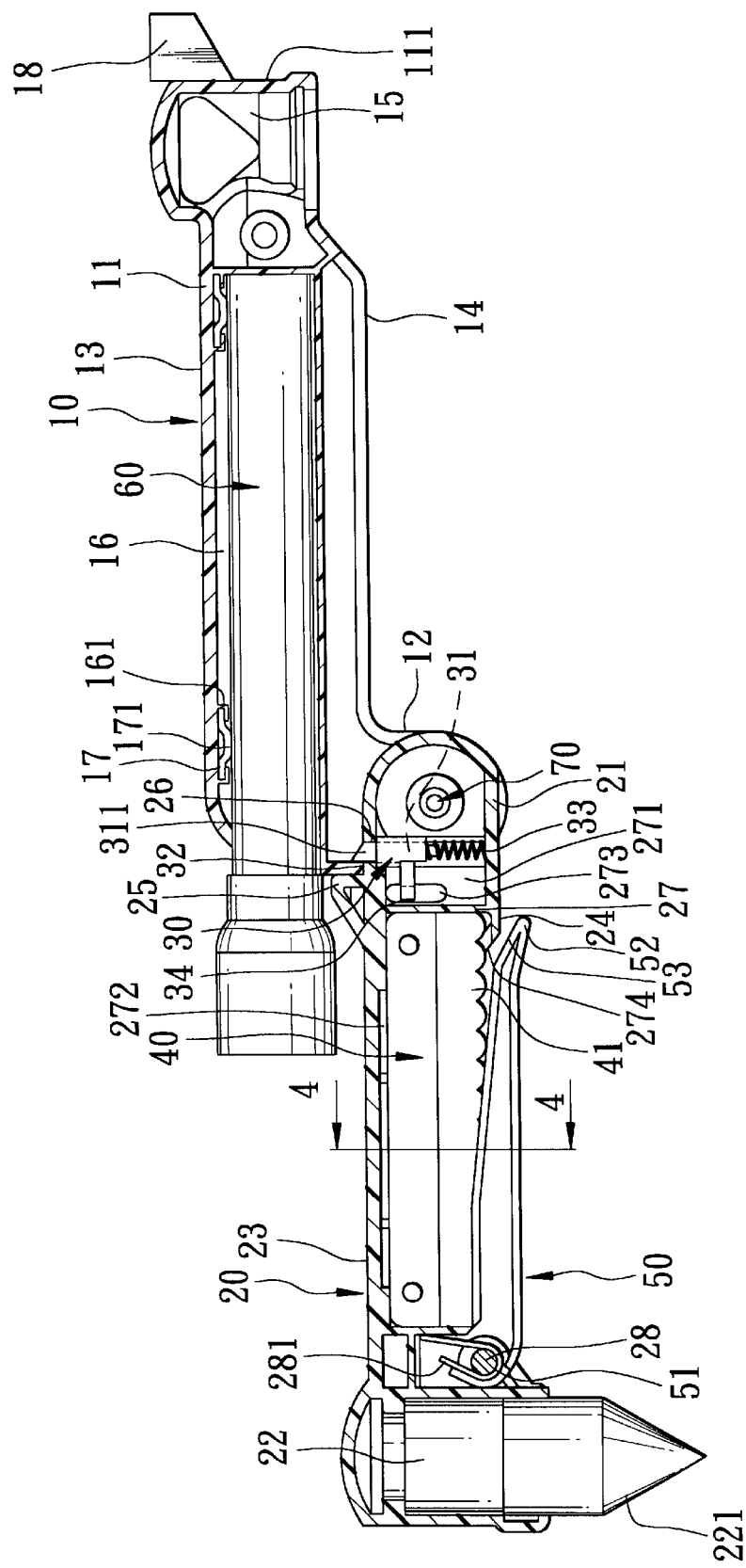
FIG. 2 is a sectional view of the preferred embodiment.
Figure 3:
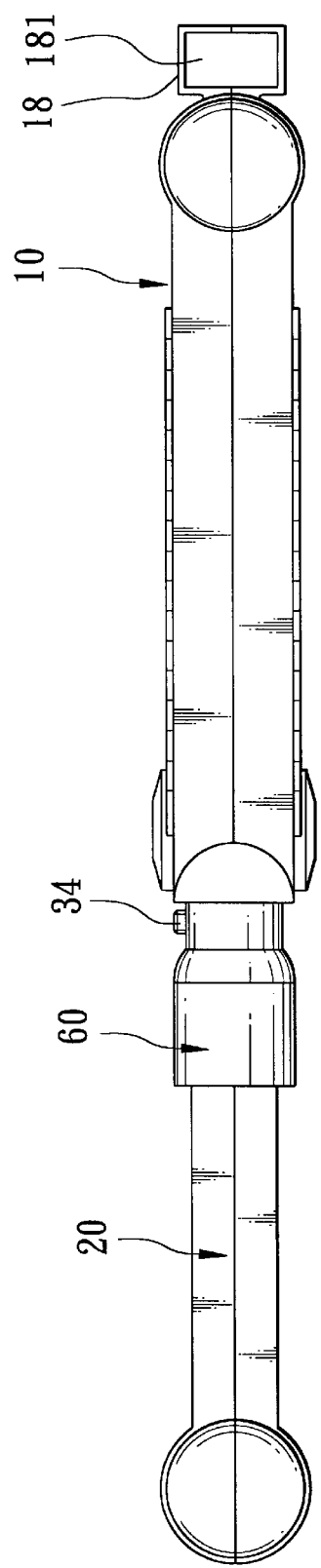
FIG. 3 is a top view of the preferred embodiment.
Figure 4:
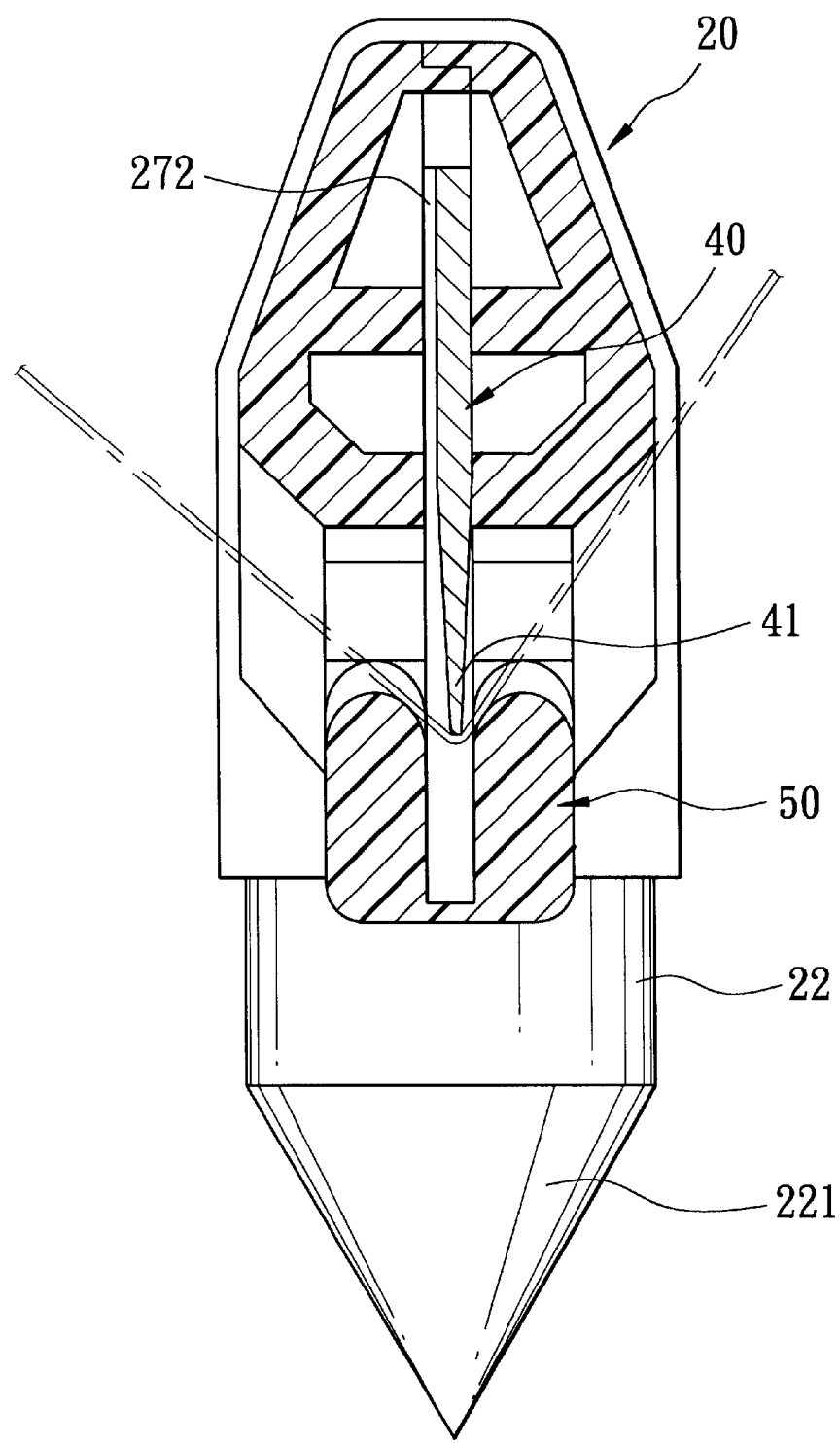
FIG. 4 is a sectional view of the preferred embodiment, taken along Line 4—4 in FIG. 2.
Figure 6:
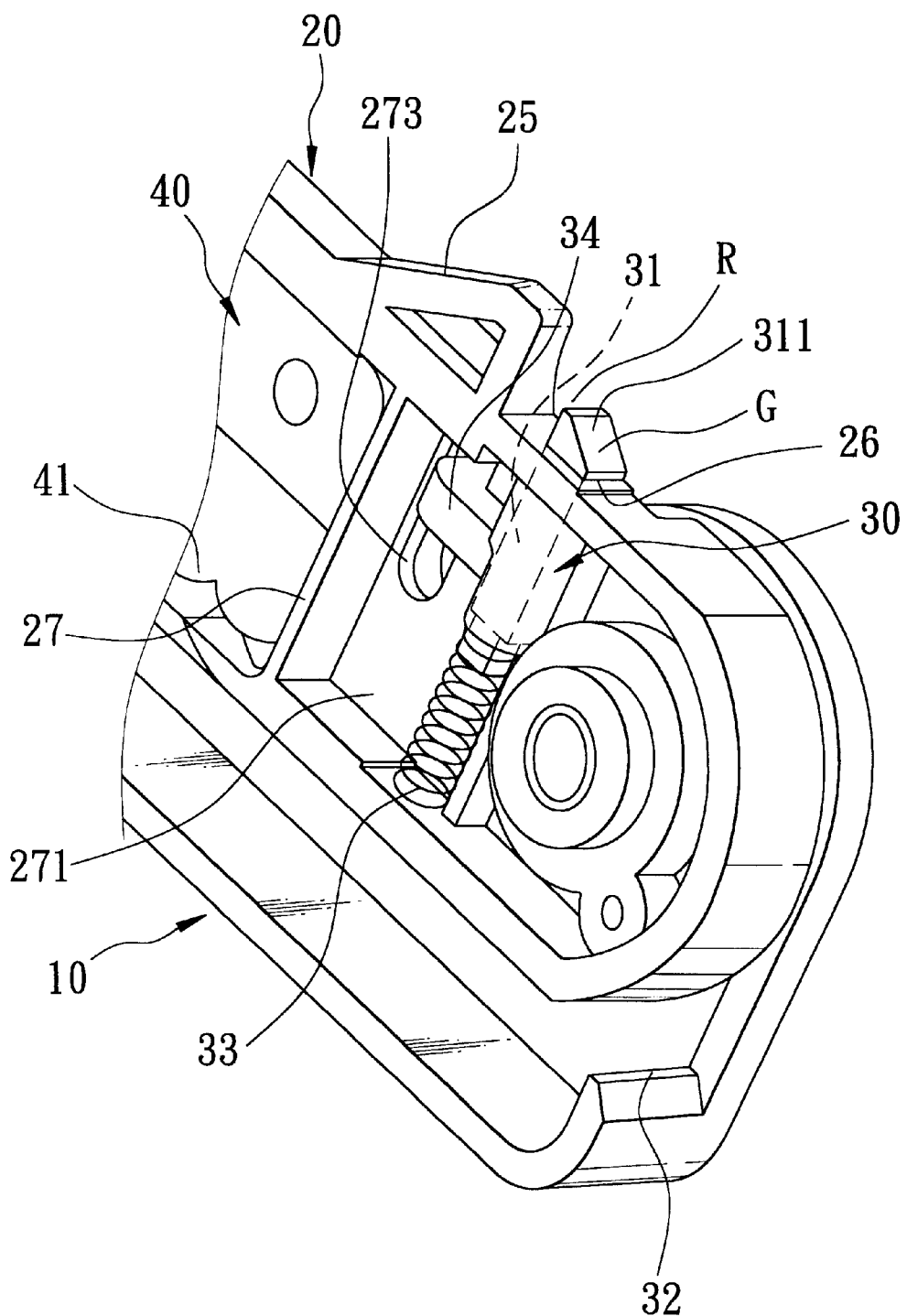
FIG. 6 is a fragmentary perspective view of the preferred embodiment when the rotary rod is disposed at the folded position.

Referring to FIGS. 2 and 6, the lock unit 30 includes a protrusion 25 formed integrally on the rod 20, a retaining pin 31 disposed slidably within an aperture 26 in the inner side surface 23 of the rod 20, a positioning element 32 formed integrally on the handle 10, and a coiled compression spring 33 for biasing a limiting end 311 of the retaining pin 31 to extend from the aperture 26. When the rod 20 is disposed at the unfolded position shown in FIG. 2, the positioning element 32 is confined within a retaining space (R), which is defined between the protrusion 25 and the limiting end 311, thereby preventing rotation of the rod 20 relative to the handle 10. The retaining pin 31 is formed integrally with an L-shaped pushing lever 34 that extends slidably through a lever opening 273 in the rod 20 and that can be pushed downward so as to retract the limiting end 311 of the retaining pin 31 into the aperture 26, thereby permitting rotation of the rod 20 from the unfolded position to the folded position. When the rod 20 is disposed at the folded position shown in FIG. 5, a striking end 221 of the hammer 22 is press fitted within the hole 15 in the tubular element 111, thereby preventing rotation of the rod 20 relative to the handle 10. When the rod 20 turns from the folded position shown in FIG. 5 to the unfolded position shown in FIG. 2, the positioning element 32 engages an inclined guiding surface (G) of the retaining pin 31 so as to push the limiting end 311 of the retaining pin 31 into the aperture 26, thereby permitting movement of the positioning element 32 into the retaining space (R).

The rod 20 further includes a partition 27, which divides the interior of the rod 20 into a right chamber 271 and a left chamber 272, in which the cutter 40 is fixed. The cutter 40 has a blade portion 41 that is exposed from a blade opening 274 in the rod 20. An elongated blade lid 50 has a pivot end 51 that is mounted pivotally on the rod 20 by means of a pivot pin 28, and a free end 52 with an inclined guiding distal end 53 that extends away from and that is spaced apart from the rod 20 at an appropriate distance, thereby facilitating actuation of the lid 50 for uncovering the blade portion 41. A torsion spring 281 biases the lid 50 to cover the blade opening 274 in the rod 20.

With this invention thus explained, it is apparent that numerous modifications and variations can be made without departing the scope and spirit of this invention. It is therefore intended that this invention be limited only as indicated by the appended claims.

I claim:

1. A foldable emergency hammer including:

a handle; and a hammerhead attached to said handle and having a striking end;

wherein the improvement comprises:

said handle being elongated and having a pivot end and a free end, which is provided with a fixed tubular element that is formed with a hole, said hole extending in a transverse direction of said handle;

a rotary rod having a pivot end connected pivotally to said pivot end of said handle, a free end, on which said hammerhead is fixed, and an intermediate portion with an elongated blade opening that extends along a longitudinal direction of said rotary rod;

a lock unit for locking said rotary rod releaseably at an unfolded position relative to said handle, said rotary rod being rotatable relative to said handle to a folded position, when unlocked from said handle, so as to engage said striking end of said hammerhead with said hole in said tubular element, thereby reducing a total length of said hammer; and a cutter secured within said rotary rod and having a blade portion that is exposed from said blade opening in said rotary rod.

2. The foldable emergency hammer as claimed in claim 1, further comprising:

an elongated blade lid having a pivot end that is mounted pivotally on said rotary rod, and a free end that is formed with an inclined guiding distal end, said distal end extending away from said rotary rod; and a spring for biasing said lid to cover said blade opening in said rotary rod.

3. The foldable emergency hammer as claimed in claim 1, wherein said pivot end of said handle has an end surface, which is formed with a bore that extends along length of said handle, said hammer further including:

an elongated flashlight accommodated within said bore; and a resilient unit for holding said flashlight within said bore.

4. The foldable emergency hammer as claimed in claim 1, wherein said tubular element is provided with a fixed socket element that has a bore, said hammer further including a whistle, which is press fitted within said bore in said socket element.

5. The foldable emergency hammer as claimed in claim 1, wherein one of said pivot ends of said handle and said rotary rod includes an integral protrusion, an aperture, and a spring-loaded retaining pin, which has a limiting end that is biased to extend from said aperture so as to define a retaining space between said protrusion and said limiting end of said retaining pin, and that is movable to retract into said aperture, the other one of said pivot ends of said handle and said rotary rod including an integral positioning element, which is confined within said retaining space, thereby locking said rotary rod on said handle, said lock unit including said protrusion, said aperture, said retaining pin, and said positioning element, whereby, when said limiting end of said retaining pin retracts into said aperture, said rotary rod can rotate from said unfolded position to said folded position.

6. The foldable emergency hammer as claimed in claim 5, wherein said retaining pin is formed with an integral pushing lever, said rotary rod having a lever opening, said pushing lever extending slidably through said lever opening and being capable of being actuated so as to retract said limiting end of said retaining pin into said aperture, thereby permitting rotation of said rotary rod from said unfolded position to said folded position.

7. The foldable emergency hammer as claimed in claim 5, wherein said limiting end of said retaining pin has an inclined guiding surface, which engages said positioning element so that said limiting end of said retaining pin is pushed by said positioning element into said aperture when said rotary rod turns from said folded position to said unfolded position.

* * * * *